July 4, 1933. D. FORBES 1,916,662

FOLDING RECEPTACLE

Filed Sept. 24, 1931 2 Sheets-Sheet 1

Donald Forbes, Inventor

By Horace C. Chandler

Attorney

July 4, 1933.   D. FORBES   1,916,662
FOLDING RECEPTACLE
Filed Sept. 24, 1931   2 Sheets-Sheet 2
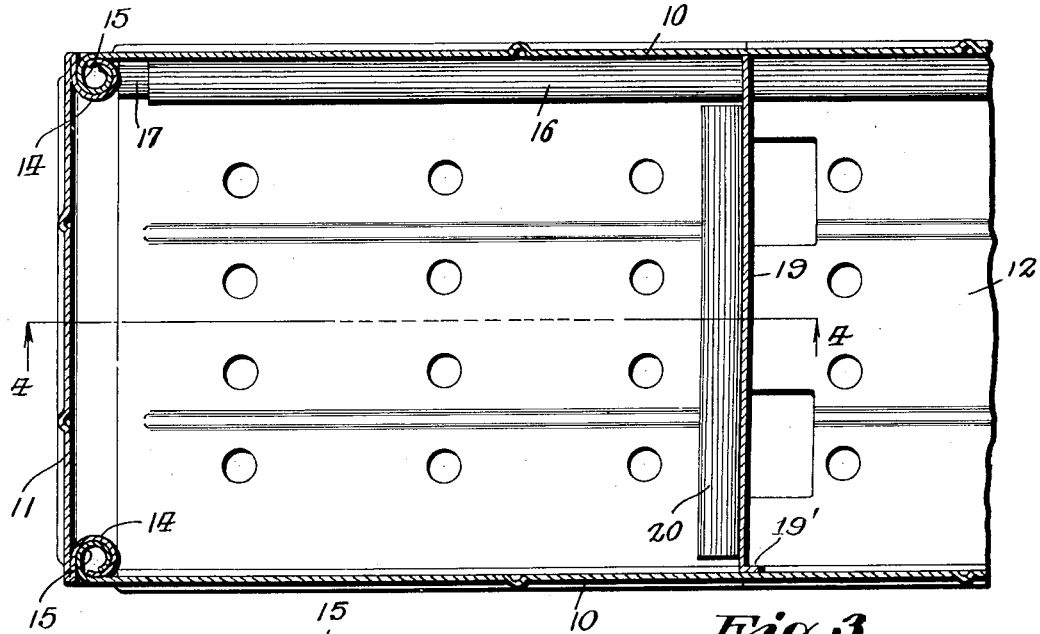
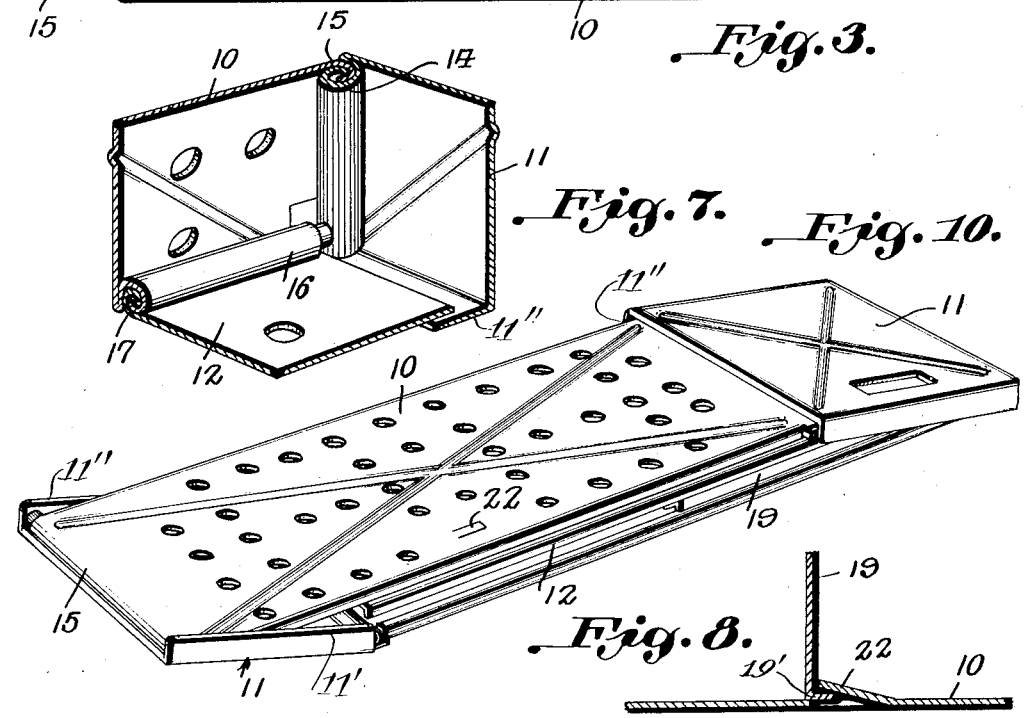
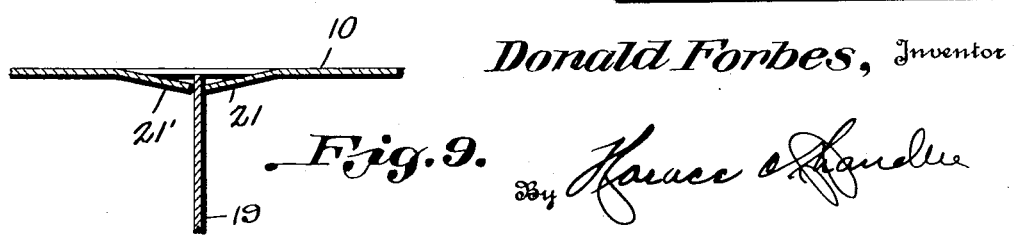
Donald Forbes, Inventor Patented July 4, 1933

1,916,662

UNITED STATES PATENT OFFICE

DONALD FORBES, OF VERO BEACH, FLORIDA

FOLDING RECEPTACLE

Application filed September 24, 1931. Serial No. 564,877.

This invention relates to new and useful improvements in containers, and particularly to knockdown and folding receptacles, especially adapted for use in orchards, and the like places.

The principal object of the invention is to provide a receptacle of this character which is simple in construction, strong and durable, and which can be easily and quickly knocked down or set up, for convenient transportation to and from the place of use.

Another object is to provide a receptacle of this character which can be more easily handled, and which will occupy less space, in a truck, than receptacles of this kind, heretofore.

Other objects and advantages will be apparent from the following description when taken in connection with the accompanying drawings.

In the drawings:

Figure 3 is a horizontal sectional view on the line 3—3 of Figure 1.

Figure 7 is a fragmentary perspective view of a corner of the receptacle, in open position, viewed from the inside.

Figure 8 is a detail sectional view on the line 8—8 of Figure 1.

Figure 9 is a detail sectional view on the line 9—9 of Figure 4.

Figure 10 is a perspective view of the receptacle in folded or collapsed condition.

Figure 1:
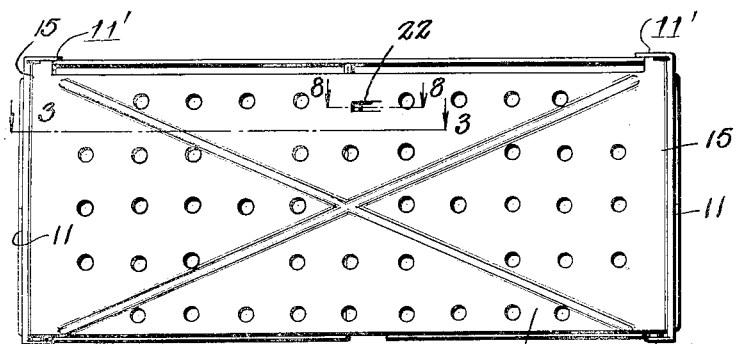
Figure 1 is a side elevation of a collapsible receptacle, made in accordance with the present invention.
Figure 2:
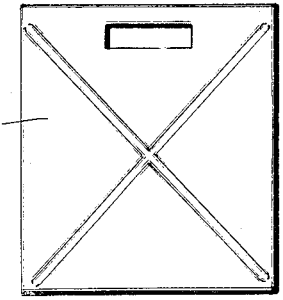
Figure 2 is an end view of the same.

Referring particularly to the accompanying drawings, 10 and 10 represent the sides of the receptacle, 11 the ends thereof, 12 the bottom, and 13 a portion of the top of the receptacle. Each of the vertical side edge portions of each of the ends 11 is rolled inwardly, away from said edge, into tubular form, as shown at 14. Each end of each of the side members 10 is similarly formed with a rolled portion 15, and each of the rolled portions 15 is engaged with a rolled portion 14, of an end 11, by telescoping the former into the latter. When these tubular portions are thus engaged, the sides and ends may be pivotally swung, with relation to each other, whereby to permit the easy and quick folding and unfolding of the said sides and ends of the container. Along the lower edge of one of the sides 10 there is formed a tubular or rolled portion 16, which is engaged, in intersliding and interswinging engagement with a correspondingly formed tubular member 17, on the adjacent side edge of the bottom 12, whereby when the sides and ends are to be moved on their pivotal connections, the bottom member may be readily swung vertically, within the enclosure of said sides and ends.

Struck out of the center of the bottom 12 are two pieces of metal, and these pieces are rolled to form the alined tubular portions 18. A vertical transverse wall 19 is provided, and on the lower edge of this wall is formed a tubular member 20, which is engaged with the tubular portions 18, so that said wall may be folded down on the bottom, to permit the collapsing of the sides and ends, as before mentioned. Struck inwardly from the upper edge of one of the sides 10 are the longitudinally extending flexible tongues 21 and 21', the same inclining inwardly, to a slight degree, and each having its inner end cut off, for a short distance, whereby to produce a space between said ends to receive and hold therebetween one of the vertical side edges of the wall 19. A single tongue 22 is struck inwardly from a corresponding portion of the other side wall 10, for engagement by the angularly turned portion 19' at the other side of the wall 19. It will thus be noted that, when the wall 19 is in vertical position, two tongues engage with one face of the wall 19, while the remaining tongue engages with the other face of said wall, so that the wall is held in vertical position. When it is desired to swing this wall 19 downwardly, the operator simply presses inwardly the tongue 21', whereby to permit movement of said wall away from the other two tongues 21 and 22.

The lower edge of the other side 10 is bent inwardly to form the ledge 23, on which the free edge of the bottom 12 is adapted to rest, when the walls are in proper set-up positions.

Figures 4, 5:
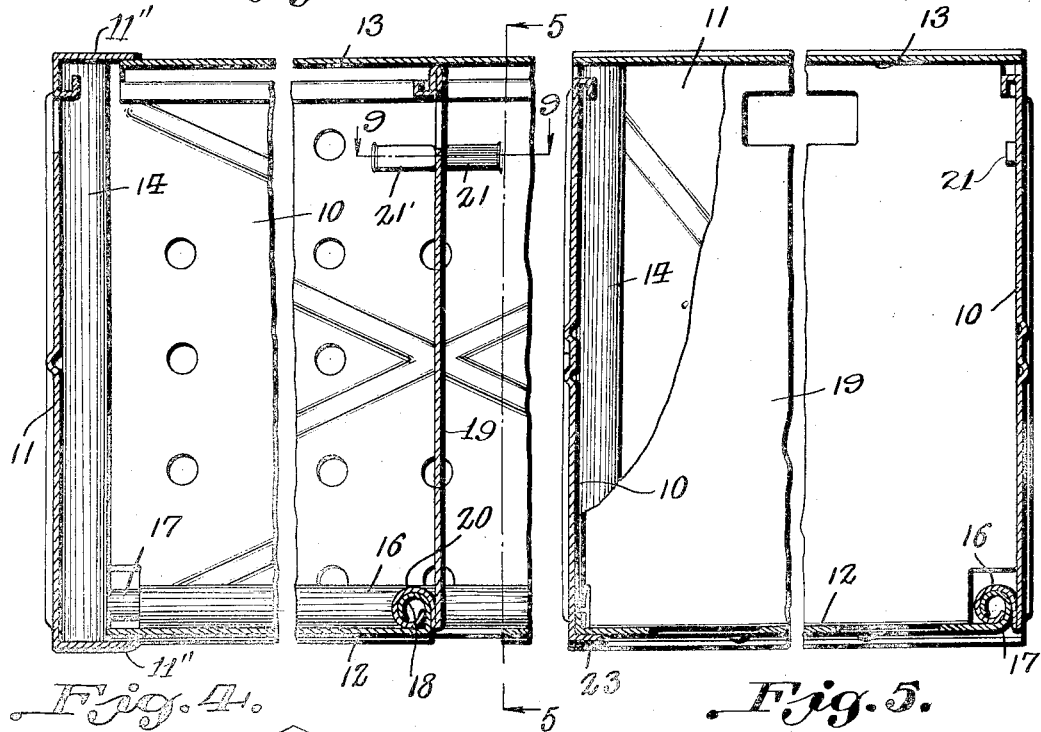
Figure 4 is a horizontal sectional view on the line 4—4 of Figure 3.
Figure 5 is a vertical transverse sectional view on the line 5—5 of Figure 4.
Figure 6:
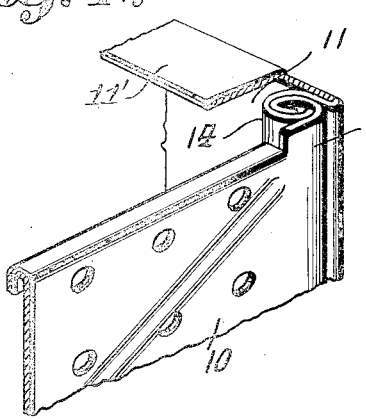
Figure 6 is a fragmentary perspective view of a corner of the receptacle, in open position, viewed from the outside.

It will be noted that the upper and lower portions of the ends 11 beyond the ends of the rolled portions of said ends, are bent over, as at 11' and 11" to cover the ends of the interengaged tubular members of the sides and ends, whereby to effectively prevent separation of these tubular portions, as will be readily understood. Beneath the upper portions 11', of the ends 11, is slipped the top or cover 13, Figures 1 and 4, while the lower portions 11" support the end portions of the bottom 12, Figure 7. It will be noted that the upper edge of the wall 19 extends slightly above the lower faces of the portions 11", so that said top will be frictionally held between the said top of the wall 19, and the lower faces of the portions 11".

Figure 10 clearly shows the condition of the receptacle, after the operator has swung the central partition downwardly and collapsed the sides and ends.

What is claimed is:

1. A collapsible receptacle comprising hingedly connected sides and ends, said ends having their upper and lower edges turned inwardly in covering relation to the ends of said hinged connections, a bottom hinged to one of said sides, an intermediate transverse partition hinged to said bottom and foldable thereonto, and a removable top frictionally engaged beneath said turned ends and bearing on the upper edge of said partition.

2. A collapsible receptacle comprising hingedly connected sides and ends, a bottom hinged to one of said sides and foldable inwardly thereagainst, an intermediate transverse partition hinged to said bottom and foldable thereonto, spaced flexible tongues on one of said sides for receiving and holding therebetween a side edge of said partition, the other side edge of said partition being extended at an angle, and a struck up tongue on the other of said sides receiving said angularly extending edge of the partition.

In testimony whereof I affix my signature.

DONALD FORBES.